United States Patent
Yasuhira

[11] Patent Number: 6,003,397
[45] Date of Patent: Dec. 21, 1999

[54] ROTARY OUTPUT TRANSMITTING STRUCTURE WITH A SLIDABLE WASHER

[75] Inventor: Nobuyuki Yasuhira, Kosai, Japan

[73] Assignee: Asmo Co., Ltd., Kosai, Japan

[21] Appl. No.: 09/022,037

[22] Filed: Feb. 11, 1998

Related U.S. Application Data

[62] Division of application No. 08/653,696, May 23, 1996, Pat. No. 5,761,964.

[30] Foreign Application Priority Data

Oct. 9, 1995 [JP] Japan .................................. 7-261771

[51] Int. Cl.⁶ ........................................................ F16H 1/16
[52] U.S. Cl. ................................ 74/425; 74/411; 411/533
[58] Field of Search ........................ 74/409, 411, 425, 74/440; 384/296; 411/531, 533

[56] References Cited

U.S. PATENT DOCUMENTS

| | | |
|---|---|---|
| 2,651,212 | 9/1953 | Mackmann . |
| 4,643,040 | 2/1987 | Adam et al. . |
| 5,027,670 | 7/1991 | Adam . |
| 5,398,564 | 3/1995 | Yoshida et al. . |
| 5,566,592 | 10/1996 | Adam et al. ............................ 74/606 R |
| 5,673,590 | 10/1997 | Gruber et al. ........................... 74/89.14 |
| 5,768,942 | 6/1998 | Gruber et al. ........................... 74/89.14 |

FOREIGN PATENT DOCUMENTS

| | | |
|---|---|---|
| 1024257 | 3/1953 | France . |
| 36 11 568 | 10/1987 | Germany . |
| 40 21 973 | 1/1992 | Germany . |
| 6-5361 | 1/1994 | Japan . |
| 8-84456 | 3/1996 | Japan . |

Primary Examiner—John A. Jeffery
Assistant Examiner—David Fenstermacher
Attorney, Agent, or Firm—Burns, Doane, Swecker & Mathis, L.L.P.

[57] ABSTRACT

A slidable washer (30) has a cylindrical part and a plane part joined thereto. The cylindrical part is placed between an inner circumferential face of a gear wheel (24) and an outer circumferential face of a boss part (23) of a gear housing (22) in order to reduce the frictional force caused during sliding movement therebetween. Further, the plane part joined to the cylindrical part is placed between a side (24b) of the gear wheel (24) and a base (22a) of the gear housing (22) so that the sliding frictional force therebetween is reduced and the cylindrical part of the slidable washer (30) is prevented from inclining toward the axial direction of the boss part (23).

16 Claims, 5 Drawing Sheets

ROTARY OUTPUT TRANSMITTING STRUCTURE WITH A SLIDABLE WASHER

This application is a divisional of application Ser. No. 08/653,696, filed May 23, 1996, now U.S. Pat. No. 5,761,964.

BACKGROUND OF THE INVENTION

1. Field of the Invention

The present invention relates to a rotary output transmitting structure, which may be used for a motor, more particularly, to a structure in which a slidable washer is placed between a gear wheel and a gear housing.

2. Related Art

In a conventional motor which may be used as the opening and closing drive for a window glass of a vehicle, a rotating speed of the rotor of a motor is reduced through a reduction gear and a driving force is transferred to an output shaft. More particularly, the rotating speed of the rotor is reduced through a gear wheel meshed with the worms formed on the rotor shaft so that driving force is transferred to the output shaft.

On the other hand, a gear housing to store the reduction gear is generally made by resin molding to be light in weight, and has a boss part integrally molded at the center thereof. While the motor is driven and the gear wheel rotates, an inner circumferential face of the gear wheel slides on an outer circumferential face of the boss part.

However, since the boss part is integrally molded with the gear housing made of resin, a sliding friction between the outer circumferential face of the boss part and the inner circumferential face of the gear wheel causes the wear of the outer circumferential face of the boss part, and consequently causes scattering of worn powders from the boss part.

Further, according to another conventional motor with a reduction gear disclosed in Japanese Utility Model Laid-Open NO. 6-5361, a sliding metallic washer is provided between an inner circumferential face of a gear wheel and an outer circumferential face of a boss part of a gear housing so that the resistance to wear is improved. However, since the metallic slidable washer placed in the spacing between the inner circumferential face of the gear wheel and the outer circumferential face of the boss part is formed in a cylindrical shape, the washer tends to incline toward the axial direction of the boss part. Therefore, when the motor is driven, it has a problem that the inclination leads to backlash and the inner circumferential face of the gear wheel cannot move smoothly on the outer circumferential face of the boss part. Furthermore, the sliding friction occurs at a place at which the slidable washer is not placed between the side of the gear wheel and the base of the gear housing, and may lead to scattering of worn powders from the gear housing.

SUMMARY OF THE INVENTION

It is an object of the present invention to provide a smooth sliding between a side of a gear wheel and a base of a gear housing, and prevent backlash of a slidable washer placed between the gear wheel and the gear housing.

According to the present invention, a slidable washer has a cylindrical part and a plane part joined thereto. The cylindrical part is placed between an inner circumferential face of a gear wheel and an outer circumferential face of a boss part of a gear housing in order to reduce the frictional force caused during sliding movement therebetween. Further, the plane part joined to the cylindrical part is placed between a side of the gear wheel and a base of the gear housing so that the sliding frictional force therebetween is reduced and the cylindrical part of the slidable washer is prevented from inclining toward the axial direction of the boss part.

Preferably, the gear wheel has a protrusion at the side thereof, and the protrusion moves slidably on the base of the gear housing through the plane part of the slidable washer. As a result, the sliding area is reduced, so that the sliding frictional force between the side of the gear wheel and the base of the gear housing is reduced. As the protrusion on the gear wheel is provided closer to the rotation center, the sliding frictional force is reduced.

Preferably, the gear housing has a plane groove to accommodate the plane part of the slidable washer in order to prevent backlash of the slidable washer, i.e., the plane part, in the radial direction thereof. In addition, when the gear wheel is stored within the gear housing, since the plane groove on the gear housing receives the protrusion of the gear wheel therein, the protruding width of the protrusion is seemingly decreased. Therefore, the protrusion of the gear wheel does not require an increase in the overall thickness of the gear housing.

More preferably, the cylindrical part of the slidable washer is composed of inside and outside cylindrical walls formed with thin metallic plates. Thereby, the wall thickness of the protrusion can be increased sufficiently.

DETAILED DESCRIPTION OF THE PRESENTLY PREFERRED EMBODIMENTS

Next, embodiments of a motor which has a structure according to the present invention will be described with reference to the drawings.

First Embodiment

Figure 1:
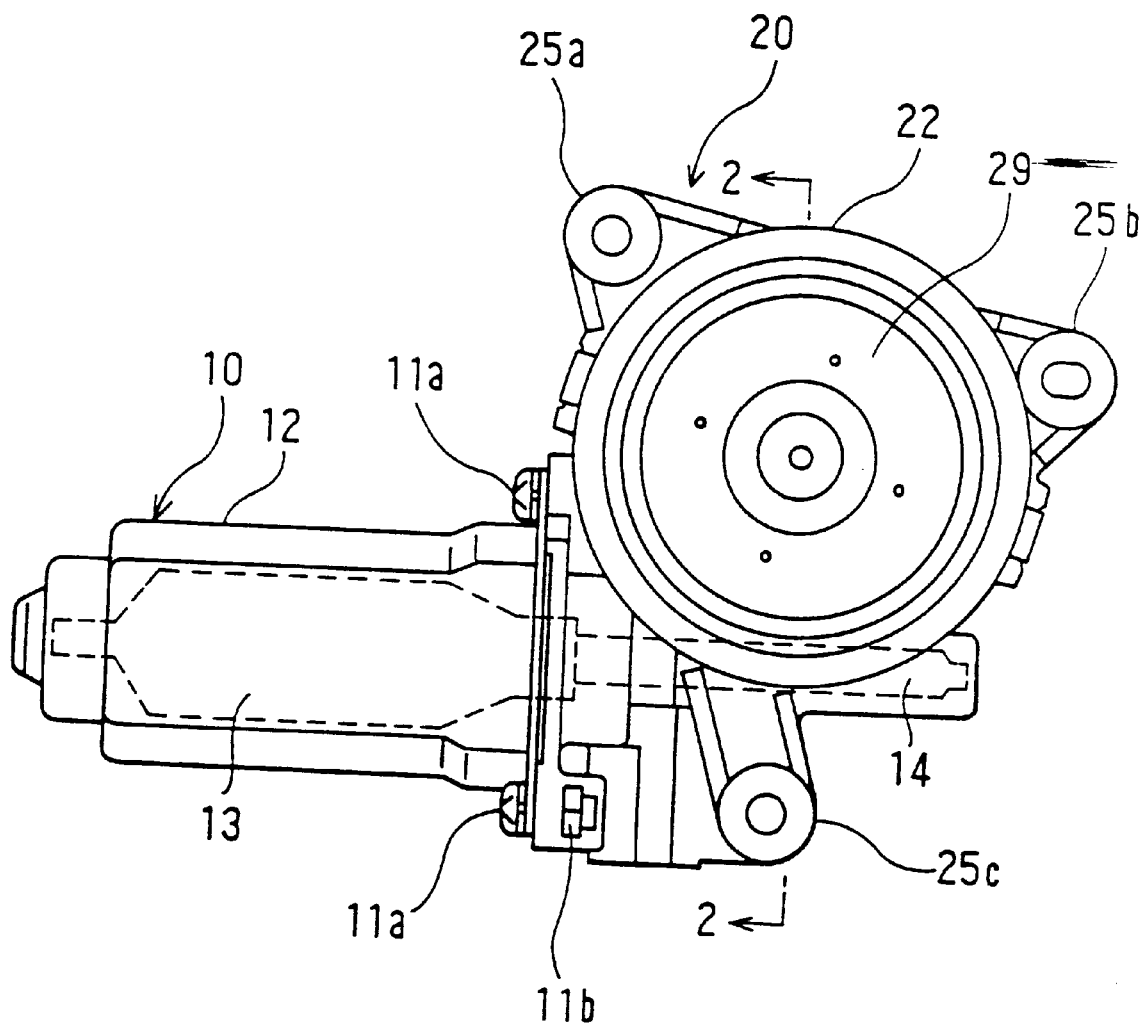
FIG. 1 is a plan view of a window driving motor in a first embodiment according to the present invention.

In a first embodiment shown in FIG. 1, a window driving motor is used for the opening and closing drive for a window glass of a vehicle.

The window driving motor is comprised mainly of a motor section 10 and a speed reduction section 20. The motor section 10 and the reduction section 20 are connected to each other with bolts 11a and nuts 11b. The motor section 10 is made up of a yoke 12, a magnet (not shown) installed to an inner circumference of the yoke 12, and a rotor 13.

Figure 2:
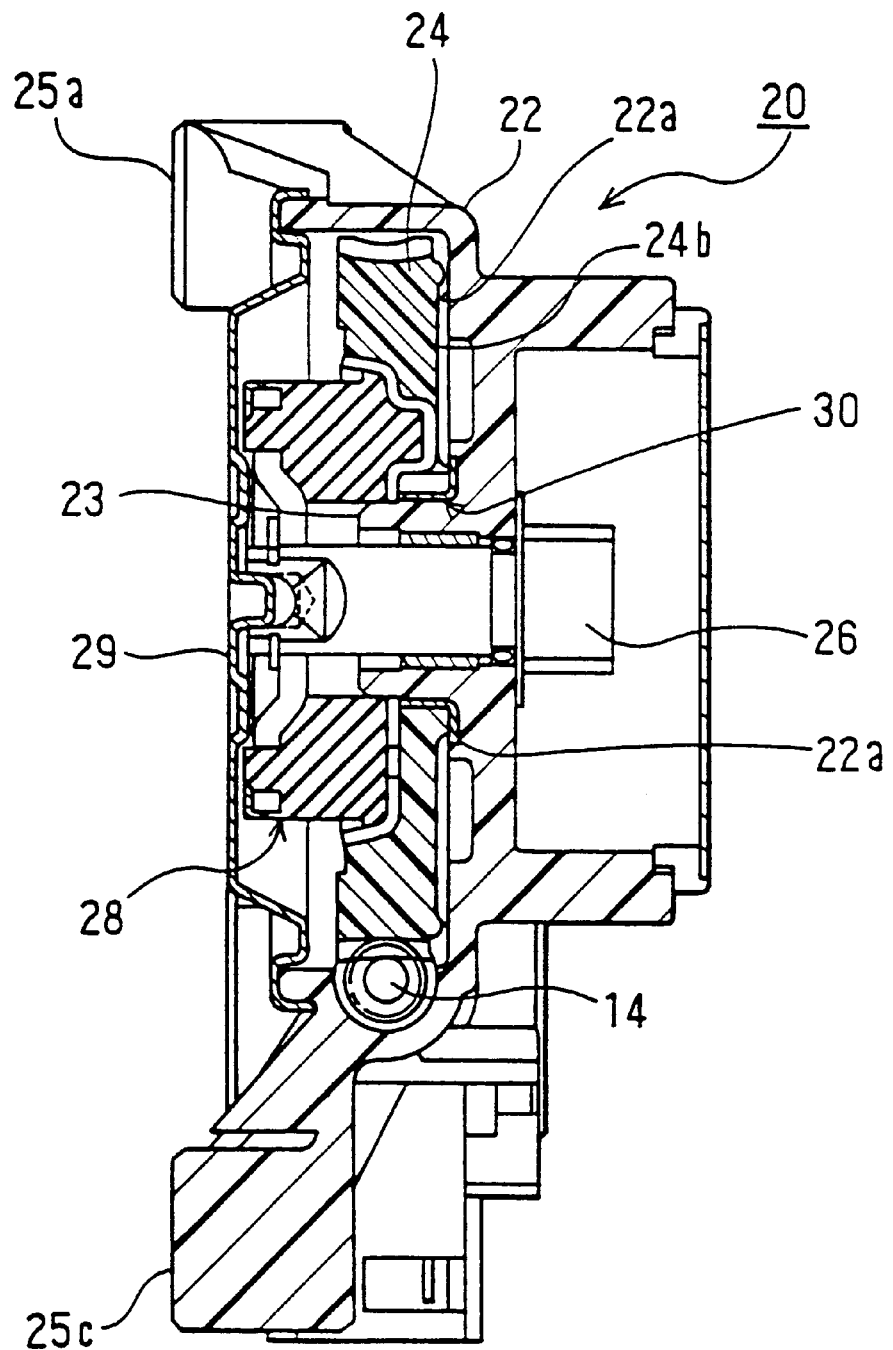
FIG. 2 is a sectional view taken along the line 2—2 in FIG. 1.
Figure 3:
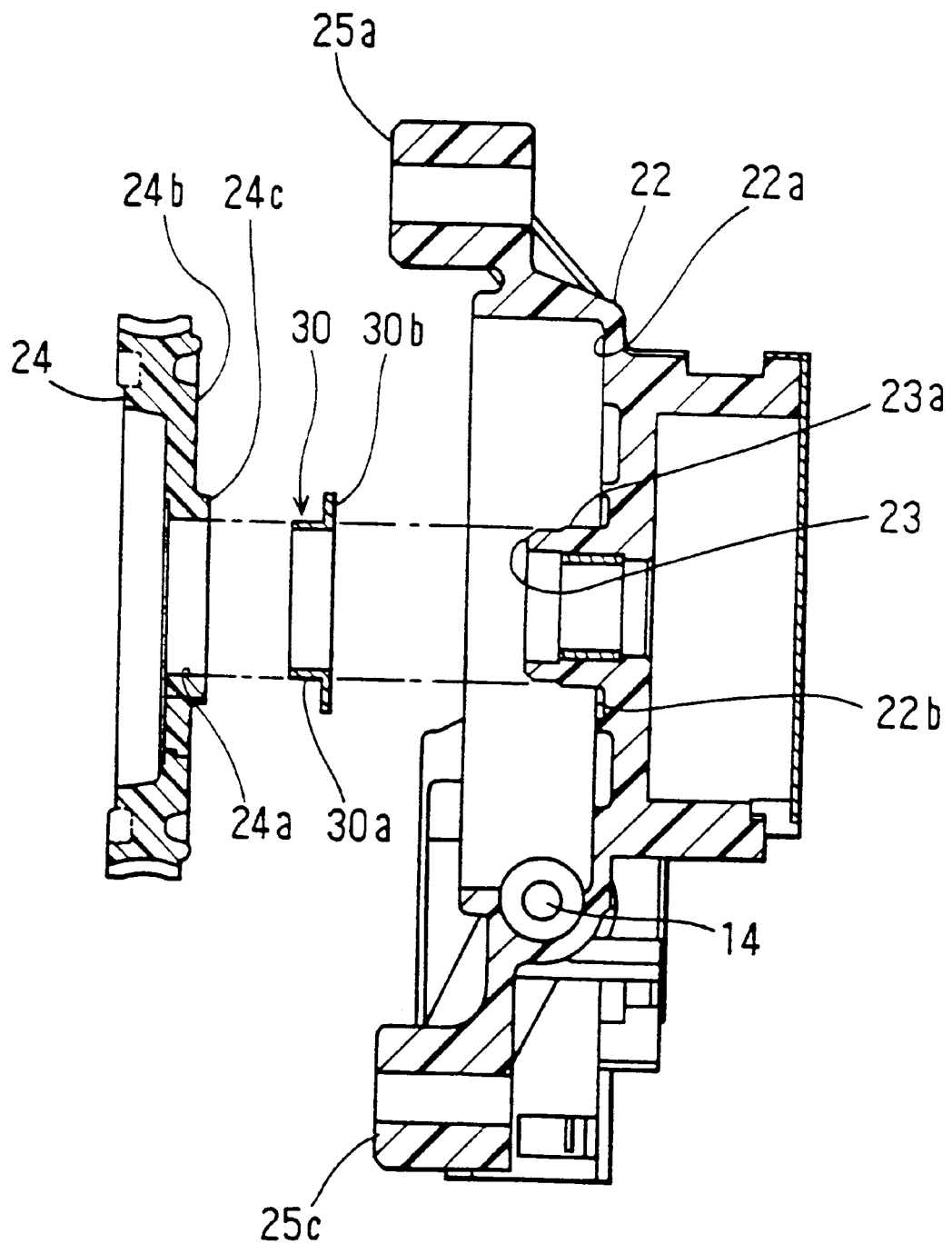
FIG. 3 is an exploded view of the main part in the first embodiment.
Figure 4:
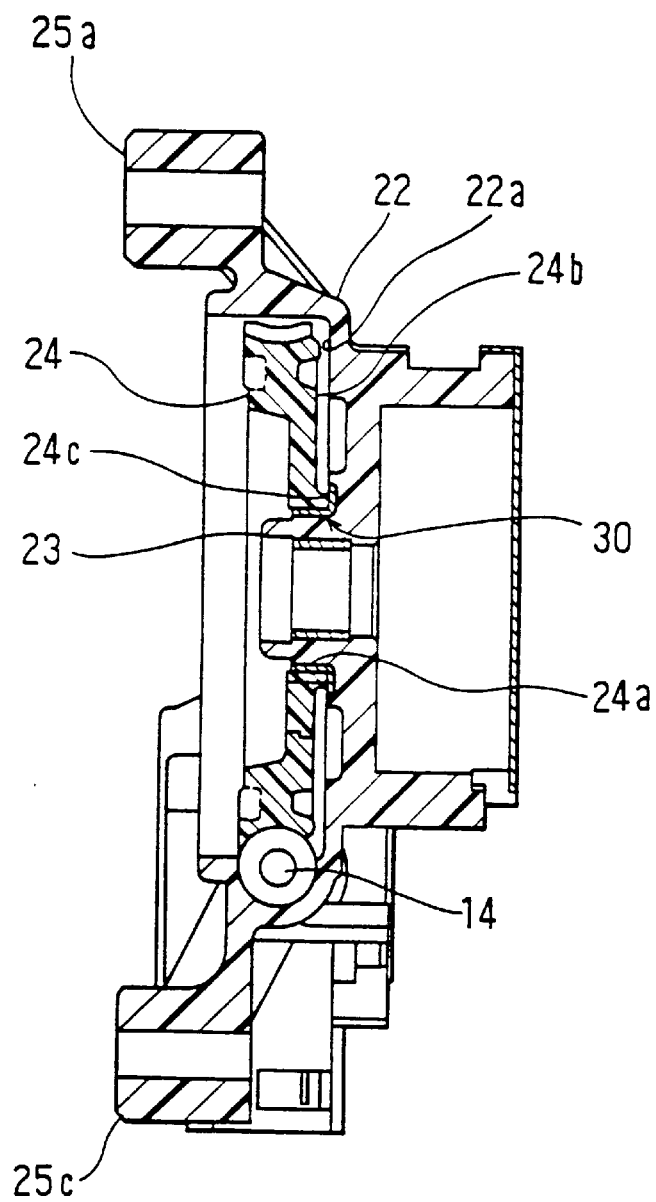
FIG. 4 is a sectional view showing an assembled state of the main part in the first embodiment.

On the other hand, as shown in FIG. 2, the reduction section 20 is made up of a gear housing 22, a gear wheel (worm wheel) 24 rotatably supported within the gear housing 22, an output shaft 26 located at the center of the gear wheel 24, a cushioning mechanism 28 for torque transmission from the gear wheel 24 to the output shaft 26, and a metallic gear cover 29. Cogs or teeth are formed on an outer circumference of the gear wheel 24 so as to engage with a worm gear 14 formed on a rotating shaft. The rotating speed of the rotor 13 is reduced through the worm gear 14 and the gear wheel 24, and transferred to the output shaft 26. As shown in FIG. 3 and FIG. 4, at a side 24b of the gear wheel 24 facing the gear housing 22, the gear wheel 24 has a protrusion 24c formed concentrically with an inner circumferential face 24a thereof. It is to be noted that FIG. 3 and FIG. 4 show only main parts in the embodiment and other parts are omitted for brevity.

The gear housing 22 is formed in a cylindrical shape which has a bottom base 22a to store the gear wheel 24. On the base 22a, a cylindrical boss part 23 is integral formed to extend axially to support rotatably the inner circumferential face 24a of the gear wheel 24. Around the boss part 23 on the base 22a, a plane groove 22b is formed in the shape of a ring. At the outer circumferential face of the gear housing 22, brackets 25a, 25b, 25c are integrated to fix the window driving motor 10 to a body (not shown) of the vehicle.

Further, a metallic slidable washer 30 is placed between the boss part 23 and the inner circumferential face 24a of the gear wheel 24, which is supported rotatably by the boss part 23.

Figure 5:
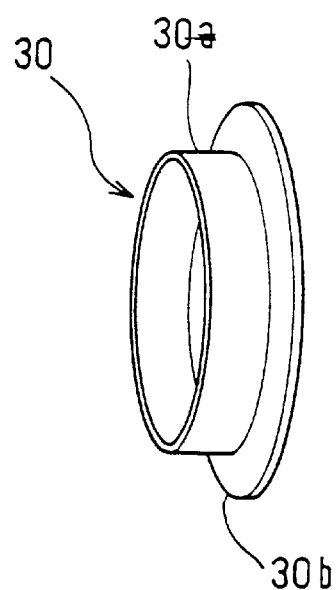
FIG. 5 is a perspective view of a slidable washer used in the first embodiment.

As shown in FIG. 5, the metallic slidable washer 30 is composed of a cylindrical part 30a and a plane part 30b, which is in the shape of a ring and joined to the cylindrical part 30a. The plane part 30b has generally the same thickness as the depth of the groove 22b.

The cylindrical part 30a of the slidable washer 30 is inserted to the boss part 23 so as to intervene between the inner circumferential face 24a of the gear wheel 24 and the outer circumferential face 23a of the boss part 23 of the gear housing 22. The plane part 30b of the slidable washer 30 is accommodated in the ring shaped plane groove 22b (shown in FIG. 3) formed on the base 22a, so that the plane part 30b lies between the protrusion 24c (shown in FIG. 3) of the gear wheel 24 and the base 22a of the gear housing 22. The protrusion 24c of the gear wheel 24 is formed to face the plane groove 22b of the gear housing 22.

Accordingly, since the cylindrical part 30a of the slidable washer 30 is placed between the inner circumferential face 24a of the gear wheel 24 and the outer circumferential face 23a of the boss part 23, it is possible to reduce the sliding frictional force therebetween.

In addition, since the plane part 30b joined to the cylindrical part 30a is placed between the side 24b of the wheel gear 24 and the base 22a of the gear housing 22, it is possible to reduce the sliding frictional force therebetween. Further, the plane part 30b, which is in contact with the base of the plane groove 22b, prevents the cylindrical part 30a of the slidable washer 30 from inclining relative to the axial direction of the boss part 23, so that it prevents the backlash of the slidable washer 30.

The gear wheel 24 is formed with the protrusion 24c at the side thereof and the protrusion 24c moves slidably on the base 22a of the gear housing 22 through the plane part 30b of the slidable washer 30. As understood from FIG. 2 and FIG. 4, the gear wheel 24 and the gear housing 22 contact axially only through the protrusion 24c, plane part 30b and groove 22b. Therefore, the sliding area can be decreased so that the sliding frictional force between the side 24b of the gear wheel 24 and the base 22a of the gear housing 22 may be decreased.

Further, the gear housing 22 is formed with the plane groove 22b on the base 22a to accommodate the plane part 30b of the slidable washer 30, so that it is possible to prevent the backlash of the slidable washer 30 (the plane part 30b) in the radial direction thereof. In addition, when the gear wheel 24 is stored within the gear housing 22, the protruding width of the protrusion 24c is seemingly reduced because of the plane groove 22b which is made to face the protrusion 24c of the gear wheel 24. Therefore, the protrusion 24c on the side of the gear wheel 24 does not require an increase in the overall thickness of the gear housing 22.

The position of the protrusion 24c may be brought near the rotation center of the gear wheel 24 in order that the area, in which the protrusion 24c and the base 22a of the gear housing 22 slide with respect to each other, can be reduced.

Further, the protrusion 24c of the gear wheel 24 may face the base 22a of the gear housing 22 through the slidable washer 30 without the plane groove 22b on the base of the gear housing 22.

Second Embodiment

Figure 6:
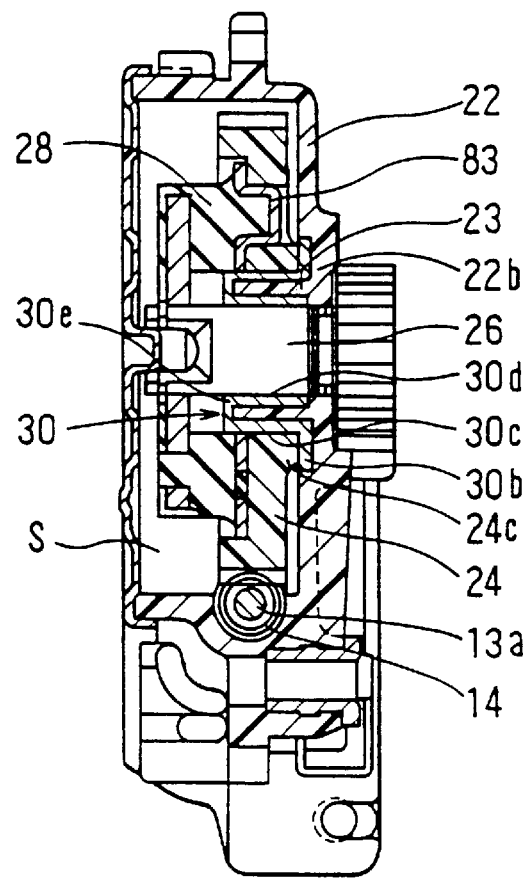
FIG. 6 is a sectional view of a window driving motor in a second embodiment according to the present invention.

According to a second embodiment shown in FIG. 6, a gear housing 22 contains a gear wheel 24 in a circular space S thereof. The gear wheel 24 engages with a worm gear 14 formed on a motor rotation shaft 13a and is driven by the worm gear 14, and is joined to an output shaft 26 through a rubber cushioning element 28 and a retention plate 83 for rotary torque transmission.

The housing 22 is made of glass fiber reinforced thermoelastic resin and has a cylindrical boss part 23 projecting axially into the circular space S. The radial inside, radial outside and axial front end faces of the cylindrical boss part 23 are covered with a slidable washer 30.

Figure 7:
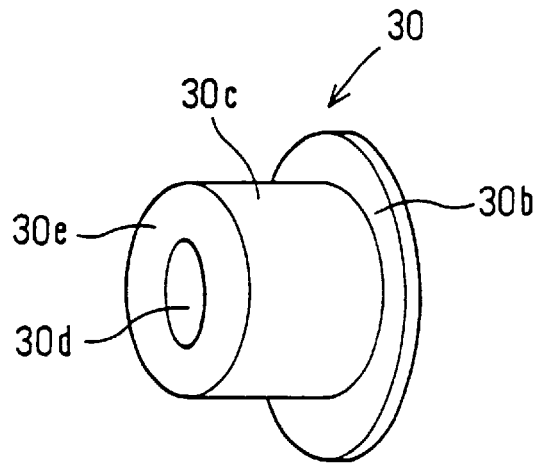
FIG. 7 is a perspective view of a slidable washer in the second embodiment.
Figure 8:
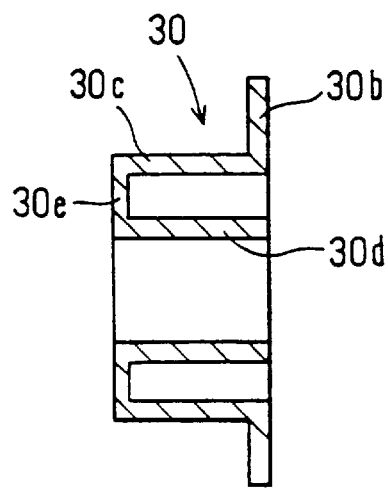
FIG. 8 is a sectional view of the slidable washer used in the second embodiment.

An entire perspective view and a sectional view of the washer 30 are shown in FIG. 7 and FIG. 8, respectively. The washer 30 is made of a carbon steel material with the thickness of 0.2–0.3 mm by press forming. The slidable washer 30 is formed in a hat shape with a plane part 30b (in a ring shape), which has a uniform width and bent in the radially outward direction from the base at right angles. The main body of the slidable washer 30 has radially inside and outside cylindrical walls 30c and 30d and an axially end wall 30e at the front end of the double walls 30c and 30d in order to connect the walls.

As shown in FIG. 6, when the washer 30 is fitted to and covers the boss part 23 of the housing 22, the outside cylindrical wall 30c of the washer 30 lies on the outer circumferencial face of the boss part 23 and contacts with the inner circumferential face of the gear wheel 24, and the inside cylindrical wall 30d of the washer 30 lies on the inner circumferencial face of the boss part 23 and contacts with the outer circumferential face of the output shaft 26. In such a condition, the end wall 30e of the washer 30 is placed at the front end face of the boss part 23, and the plane part 30b is received in the groove 22b of the housing 22 and contacts with the side of the gear wheel 24.

According to the above structure, the center of the gear wheel 24 is supported by the boss part 23. When the gear wheel 24 rotates, the sliding characteristic thereof is secured by the outside cylindrical wall 30c of the washer 30 which contacts with the inner circumferential face of the gear wheel 24. The output shaft 26 is rotatably supported by the boss part 23. At the same time, the sliding characteristic is secured by the inside cylindrical wall 30d of the washer 30 which contacts the outer circumferential face of the output shaft 26. Further, the gear wheel 24 can be positioned by the plane part 30*b* of the washer 30 in the direction of the thrust through the protrusion 24*c*, plane part 30*b* and groove 22*b*, and the smooth sliding rotation can be ensured thereby.

In this way, the metallic washer 30 made by press forming ensures the sliding rotation between the gear wheel 24 and output shaft 26. In this case, as the thickness of the metallic washer 30 can be made thinner, it is possible to increase the thickness of the boss part 23 without enlarging the diameter of the device. As a result, even if the housing 22 is made of low-priced glass fiber-reinforced thermoelastic resin, the boss part 23 exhibits enough stiffness against the deformation force which may be applied to it when the output shaft 26 is locked.

Further, in the second embodiment, when the load is not so great in the direction of the thrust, the plane part 30*b* of the washer 30 is not necessarily required. Furthermore, the plane groove 22*b* may not be required on the housing 22, and the protrusion 24*c* may not be required on the side 24*b* of the gear wheel 24.

The present invention has been described with reference to the first and second embodiments. But, the present invention is not limited thereto but may be applied for any structure in which a rotation body is supported by a boss part of a housing.

What is claimed is:

1. A rotation output transmitting structure comprising:
   a rotor with a worm;
   an output shaft;
   a gear wheel engaged with said worm and rotated in a reduced speed;
   a gear housing made of resin and having a cylindrical boss and a bottom face, said cylindrical boss rotatably supporting said output shaft at an inner circumferential face thereof and rotatably supporting said gear wheel at an outer circumferential face thereof; and
   a slidable washer made of metal and having a first cylindrical part, a second cylindrical part and an end wall connecting said first and second cylindrical parts, said first cylindrical part being interposed between an inner circumferential face of said gear wheel and said outer circumferential face of said cylindrical boss, said second cylindrical part being interposed between said inner circumferential face of said cylindrical boss and an outer circumferential face of said output shaft.

2. A rotation output transmitting structure according to claim 1, wherein:
   said slidable washer further has a ring-shaped plane part extending radially from said first cylindrical part and interposed between said bottom face of said gear housing and a side face of said gear wheel facing said bottom face.

3. A rotation output transmitting structure according to claim 1, further comprising a cushioning member disposed between said output shaft and said wheel gear for transmitting torque from said gear wheel to said output shaft.

4. A rotation output transmitting structure according to claim 3, wherein said cushioning member is made of rubber.

5. A rotation output transmitting structure comprising:
   a rotor with a worm;
   an output shaft;
   a gear wheel engaged with said worm and rotated in a reduced speed;
   a gear housing made of resin and having a cylindrical boss and a bottom face, said cylindrical boss rotatably supporting said output shaft at an inner circumferential face thereof and rotatable supporting said gear wheel at an outer circumferential face thereof; and
   a slidable washer made of metal and having a first cylindrical part and a second cylindrical part, said first cylindrical part being interposed between an inner circumferential face of said gear wheel and said outer circumferential face of said cylindrical boss, and said second cylindrical part being interposed between said inner circumferential face of said cylindrical boss and an outer circumferential face of said output shaft;
   wherein said slidable washer further has a ring-shaped plane part extending radially from said first cylindrical part and interposed between said bottom face of said gear housing and a side face of said gear wheel facing said bottom face;
   said gear wheel is formed with a protrusion part protruding from said side face toward said bottom face; and
   said plane part of said slidable washer is interposed between said protrusion part and said bottom face.

6. A rotation output transmitting structure according to claim 5, wherein:
   said gear housing is formed with a groove on said bottom face at a location facing said protrusion of said gear wheel to receive said plane part of said slidable washer.

7. A rotation output transmitting structure according to claim 6, wherein a depth of said groove of said gear housing is substantially equal to a thickness of said plane part of said slidable washer.

8. A rotation output transmitting structure according to claim 5, wherein a width of said protrusion part of said gear wheel in a radial direction of said gear wheel is less than a width of said plane part of said slidable washer in a radial direction of said plane part, and said gear wheel is held in contact with said gear housing through said protrusion part thereof and said plane part of said slidable washer.

9. A rotation output transmitting structure comprising:
   a rotary member;
   an output shaft;
   a cushioning member disposed between said output shaft and said rotary member for transmitting torque from said rotary member to said output shaft;
   a slidable washer disposed between said rotary member and said output shaft and having a first cylindrical part, a second cylindrical part that is coaxial with said first cylindrical part and having a diameter larger than that of said first cylindrical part, and a ring-shaped end wall connecting said first and second cylindrical parts; and
   a housing having a cylindrical boss and a bottom face, said cylindrical boss protruding from said bottom face in an axial direction of said output shaft and interposed between said first and second cylindrical parts of said slidable washer to rotatably support said output shaft and said rotary member via said first and second cylindrical parts.

10. A rotation output transmitting structure according to claim 9, wherein said cushioning member is made of rubber.

11. A rotation output transmitting structure comprising:
    a rotary member;
    an output shaft;
    a cushioning member disposed between said output shaft and said rotary member for transmitting torque from said rotary member to said output shaft;
    a slidable washer disposed between said rotary member and said output shaft and having a first cylindrical part, a second cylindrical part that is coaxial with said first cylindrical part and having a diameter larger than that of said first cylindrical part, and a ring-shaped end wall connecting said first and second cylindrical parts; and a housing having a cylindrical boss and a bottom face, said cylindrical boss protruding from said bottom face in an axial direction of said output shaft and interposed between said first and second cylindrical parts of said slidable washer to rotatably support said output shaft and said rotary member via said first and second cylindrical parts;

wherein said slidable washer further has a ring-shaped plane part extending radially from said second cylindrical part on an opposite side with respect to said end wall and interposed between said bottom face of said housing and said rotary member facing said bottom face.

12. A rotation output transmitting structure according to claim 11, wherein said rotary member has a protrusion part protruding from said rotary member toward said bottom face of said housing at a location facing said plane part of said slidable washer.

13. A rotation output transmitting structure according to claim 12, wherein a width of said protrusion part of said rotary member in a radial direction of said rotary member is less than that of said plane part of said slidable washer in said radial direction.

14. A rotation output transmitting structure according to claim 13, wherein:

said housing has a groove on said bottom face thereof to receive said plane part of said slidable washer.

15. A rotation output transmitting structure according to claim 14, wherein a depth of said groove is approximately equal to a thickness of said plane part of said slidable washer.

16. A rotation output transmitting structure according to claim 11, wherein:

said housing has a ring-shaped groove on said bottom face thereof to accommodate said plane part of said slidable washer therein, said groove having a depth approximately equal to a thickness of said plane part of said slidable washer.

* * * * *